Patented Oct. 25, 1927.

1,647,082

UNITED STATES PATENT OFFICE.

WILLIAM F. COLE, OF HANA, TERRITORY OF HAWAII.

PROCESS OF MANUFACTURING SIRUP.

No Drawing.    Application filed May 1, 1925. Serial No. 27,301.

This invention relates to certain new and useful improvements in processes or methods of manufacturing food products.

The principal object of this invention is to produce a pure and palatable sirup made from raw wash sugar as the base, to which are added certain ingredients serving to neutralize the acidity and coagulate the albumen present in the sugar.

A further object of this invention is to produce a sirup which is economical to manufacture, and exceedingly palatable.

Heretofore, as far as I am aware, refined sugar has been employed as the base for sirup. The use of refined sugar has necessitated time, labor and expense incident to the refining of the sugar. Furthermore, the time required for refining the sugar has caused considerable inconvenience and especially in localities where no refining plant is in operation, which fact has made it necessary for the manufacturer to ship the raw wash sugar to a distant point and await the return of the refined sugar before the manufacture of the sirup could be accomplished.

To overcome this inconvenience I propose to utilize the raw wash sugar without refining the same and in a short time and with a minimum cost, manufacture a sirup that is pure and exceedingly palatable.

In carrying out my process I take a quantity of raw wash sugar and apply steam to the same, the heat content of the steam serving to dissolve the sugar until the resultant solution is of approximately 60° sugar, the scale of 60° being determined by the use of a Ballinger saccharimeter. After this step I add to the solution a neutralizing agent, such as lime water, for the purpose of neutralizing the acidity and coagulating the albumen present.

To the resultant product I add salt, the proportion being one-half ounce of salt to one hundred pounds of sugar. The salt referred to assists in the coagulation and neutralization of the other ingredients, and serves to flavor the sirup product. The product is then passed through a bone charcoal filter for the purpose of removing the impurities from the sugar. After this operation I obtain an inexpensive and pure white sirup product.

While I have set forth the use of steam for obtaining the 60° sugar solution and have mentioned a bone charcoal filter for the filtering process, nevertheless, it is to be understood that I may employ apparatus of any character whereby the same result is obtained.

Having thus described my invention, I claim:—

The herein described process of producing sirup which consists in dissolving raw wash sugar in steam, adding lime to neutralize the acidity and coagulate the albumin, next adding to the mixture salt in the proportion of one-half ounce to one hundred pounds of sugar, and finally filtering the solution through bone charcoal.

In testimony whereof I affix my signature

WILLIAM F. COLE.